United States Patent
Andrews et al.

(10) Patent No.: US 10,419,214 B2
(45) Date of Patent: Sep. 17, 2019

(54) MOBILE DEVICE MANAGEMENT DELEGATE FOR MANAGING ISOLATED DEVICES

(71) Applicant: Dell Products L.P., Round Rock, TX (US)

(72) Inventors: Carlton A. Andrews, Austin, TX (US); Warren W. Robbins, Celina, TX (US); Yuan-Chang Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 644 days.

(21) Appl. No.: 14/981,031

(22) Filed: Dec. 28, 2015

(65) Prior Publication Data
US 2017/0187523 A1    Jun. 29, 2017

(51) Int. Cl.
*H04L 9/08*    (2006.01)
*H04L 29/06*   (2006.01)
*H04W 12/00*   (2009.01)

(52) U.S. Cl.
CPC ............ *H04L 9/085* (2013.01); *H04L 63/00* (2013.01); *H04L 63/062* (2013.01); *H04W 12/0027* (2019.01); *H04L 2209/80* (2013.01)

(58) Field of Classification Search
CPC ....... H04L 9/085; H04L 63/00; H04L 63/062; H04L 2209/80; H04L 9/0822; H04L 9/0816; H04L 63/06; H04L 63/08; H04L 9/08; H04W 12/0027; G06F 21/40
USPC ...................................................... 713/168
See application file for complete search history.

(56) References Cited

U.S. PATENT DOCUMENTS

| | | | | |
|---|---|---|---|---|
| 6,587,946 | B1 * | 7/2003 | Jakobsson | H04L 63/02 380/286 |
| 7,904,895 | B1 * | 3/2011 | Cassapakis | G06F 8/654 717/168 |
| 8,190,905 | B1 * | 5/2012 | Chang | H04L 63/0428 380/286 |
| 8,301,884 | B2 * | 10/2012 | Choi | H04L 9/3239 713/160 |
| 8,799,641 | B1 * | 8/2014 | Seidenberg | H04L 63/0876 713/153 |
| 8,910,264 | B2 * | 12/2014 | Qureshi | G06F 21/41 709/202 |
| 9,455,886 | B2 * | 9/2016 | Qureshi | H04L 12/2856 |

(Continued)

*Primary Examiner* — Kambiz Zand
*Assistant Examiner* — Mahabub S Ahmed
(74) *Attorney, Agent, or Firm* — Jackson Walker L.L.P.

(57) ABSTRACT

A device manager establishes a mobile device and a gateway as managed devices. The device manager generates management metadata and a split cryptographic key. The management metadata may include information identifying the mobile device. The metadata may include a gateway key part and a mobile key part which, in combination, are sufficient to decrypt information encrypted with the management split key. The device manager may encrypt the management metadata using the management split key. The device manager may send the gateway key part and the encrypted management metadata to the gateway and the mobile key part to the mobile device. Subsequent delivery of the mobile key part to the gateway, by the mobile device, enables the gateway to decrypt the encrypted management metadata and recognize the mobile device as a management device delegate sanctioned by the device manager to perform delegated management of the gateway.

16 Claims, 7 Drawing Sheets

(56) References Cited

U.S. PATENT DOCUMENTS

| | | | |
|---|---|---|---|
| 10,211,977 B1* | 2/2019 | Roth | H04L 9/08 |
| 2004/0073801 A1* | 4/2004 | Kalogridis | G06F 21/305 |
| | | | 713/176 |
| 2004/0199665 A1* | 10/2004 | Omar | H04L 29/06 |
| | | | 709/238 |
| 2007/0156897 A1* | 7/2007 | Lim | G06Q 10/10 |
| | | | 709/225 |
| 2007/0226358 A1* | 9/2007 | Krywaniuk | H04L 41/00 |
| | | | 709/229 |
| 2008/0289019 A1* | 11/2008 | Lam | G06F 21/41 |
| | | | 726/9 |
| 2009/0022068 A1* | 1/2009 | Iyer | H04L 41/0806 |
| | | | 370/254 |
| 2009/0077379 A1* | 3/2009 | Geyzel | H04L 9/085 |
| | | | 713/170 |
| 2009/0181684 A1* | 7/2009 | Kronlund | H04M 1/006 |
| | | | 455/445 |
| 2010/0030995 A1* | 2/2010 | Wang | G06F 16/2282 |
| | | | 711/173 |
| 2010/0154040 A1* | 6/2010 | Chiu | H04L 63/0823 |
| | | | 726/5 |
| 2011/0033050 A1* | 2/2011 | Maller | G06Q 30/02 |
| | | | 380/259 |
| 2011/0270763 A1* | 11/2011 | Graham, III | G06Q 20/102 |
| | | | 705/71 |
| 2012/0036442 A1* | 2/2012 | Dare | G06F 8/60 |
| | | | 715/736 |
| 2012/0122434 A1* | 5/2012 | Rao | H04L 67/06 |
| | | | 455/414.1 |
| 2012/0135719 A1* | 5/2012 | Haughn | G06F 8/65 |
| | | | 455/414.1 |
| 2012/0185500 A1* | 7/2012 | Bhogal | G06F 9/5027 |
| | | | 707/769 |
| 2012/0210135 A1* | 8/2012 | Panchapakesan | H04L 9/0822 |
| | | | 713/172 |
| 2012/0239936 A1* | 9/2012 | Holtmanns | H04L 9/3213 |
| | | | 713/176 |
| 2012/0255026 A1* | 10/2012 | Baca | G06F 21/10 |
| | | | 726/26 |
| 2013/0185809 A1* | 7/2013 | Yabe | H04L 63/10 |
| | | | 726/28 |
| 2013/0208591 A1* | 8/2013 | Larsen | H04L 63/0281 |
| | | | 370/230 |
| 2013/0219176 A1* | 8/2013 | Akella | H04L 63/0815 |
| | | | 713/165 |
| 2013/0291056 A1* | 10/2013 | Gaudet | H04W 12/06 |
| | | | 726/1 |
| 2014/0201533 A1* | 7/2014 | Kruglick | H04L 63/062 |
| | | | 713/171 |
| 2014/0281523 A1* | 9/2014 | Golino | H04L 63/0428 |
| | | | 713/168 |
| 2014/0380054 A1* | 12/2014 | Roth | H04L 9/0822 |
| | | | 713/171 |
| 2014/0380499 A1* | 12/2014 | Pruss | G06F 21/62 |
| | | | 726/27 |
| 2015/0113627 A1* | 4/2015 | Curtis | H04L 63/06 |
| | | | 726/10 |
| 2015/0271158 A1* | 9/2015 | Ronca | H04L 9/0819 |
| | | | 713/168 |
| 2015/0312759 A1* | 10/2015 | Kim | G06F 21/10 |
| | | | 455/411 |
| 2015/0347188 A1* | 12/2015 | Iyer | G06F 9/4881 |
| | | | 718/106 |
| 2015/0378842 A1* | 12/2015 | Tomlinson | G06F 21/40 |
| | | | 380/28 |
| 2016/0189136 A1* | 6/2016 | Mercille | G06Q 20/3227 |
| | | | 705/44 |
| 2016/0269371 A1* | 9/2016 | Coimbatore | H04L 63/0471 |
| 2017/0161298 A1* | 6/2017 | Banerjee | G06F 16/182 |
| 2017/0163525 A1* | 6/2017 | Fedor | H04L 45/28 |
| 2017/0180911 A1* | 6/2017 | Burton | H04W 4/70 |
| 2017/0207910 A1* | 7/2017 | McGregor, Jr. | H04L 9/0836 |
| 2018/0054316 A1* | 2/2018 | Tomlinson | H04L 9/0631 |
| 2018/0357264 A1* | 12/2018 | Rice | G06F 16/27 |

* cited by examiner

MOBILE DEVICE MANAGEMENT DELEGATE FOR MANAGING ISOLATED DEVICES

TECHNICAL FIELD

Disclosed subject matter is in the field of device management and, more particularly, management of remotely inaccessible devices.

BACKGROUND

As the value and use of information continues to increase, individuals and businesses seek additional ways to process and store information. Information handling systems represent one option available to users. An information handling system generally processes, compiles, stores, and/or communicates information or data for business, personal, or other purposes thereby allowing users to take advantage of the value of the information.

Because information handling needs and requirements vary between different users or applications, information handling systems may also vary regarding what information is handled, how the information is handled, how much information is processed, stored, or communicated, and how quickly and efficiently the information may be processed, stored, or communicated. Variations in information handling systems allow for information handling systems to be general or configured for a specific user or specific use such as financial transaction processing, airline reservations, enterprise data storage, or global communications. Information handling systems may also include a variety of hardware and software components that may be configured to process, store, and communicate information and may include one or more computer systems, data storage systems, and networking systems.

A headless information handling system is a type of information handling system that does not require and typically does not include human-useable I/O devices including a keyboard, mouse, microphone, display device, or speaker to perform its primary function or functions. An Internet-of-Things (IoT) gateway is an example of a headless device. An IoT gateway is often deployed to perform, monitor, facilitate, or support a particular process or a particular location or facility, sometimes in conjunction with one or more smart sensors or other types of Internet-of-Things devices that provide data to the gateway.

At some point after being deployed, gateways may experience persistent or intermittent loss of connectivity with external networks and resources, including the Internet and cloud-based resources. The loss of connectivity may be influenced by factors including a lack of human-based I/O, installations at remote and inaccessible locations, and the confidential nature of at least some purposes for which gateways may be tasked. Nevertheless, gateway devices, like many information handling systems, may require or benefit from at least some form of device management from time to time. Managing a communicatively inaccessible device via conventional networks using traditional device management resources may prove challenging or unworkable.

SUMMARY

In accordance with the teachings of the present disclosure, disadvantages and problems associated with managing gateways and other isolated or inaccessible devices may be reduced or eliminated.

In accordance with disclosed embodiments, a device management method at least partially performed by a device management resource, which may also be referred to herein as a device manager, and which may be implemented as a cloud-based resource or as a premises-installed or network-accessible device management server, includes establishing, by the device manager, a mobile device and a gateway device as managed devices. The device manager may generate management metadata, including information indicative of an identity of the mobile device, and a first split cryptograph key, referred to herein as the management split key. The management split key may include a gateway key part and a mobile key part where the combination of the gateway key part and the mobile key part may be sufficient to decrypt information encrypted in accordance with the management split key, although the management split key may include key parts in addition to the gateway key part and the mobile key part. The device manager may also generate encrypted management metadata, which includes the management metadata encrypted with the management split key.

The device manager may then send the gateway key part and the encrypted management metadata to the gateway device and send the mobile key part to the mobile device. In at least one embodiment, subsequent receipt of the mobile key part by the gateway device enables the gateway device to decrypt the encrypted management metadata and recognize the mobile device as a management device delegate sanctioned by the device manager to perform delegated management of the gateway device.

The management metadata may include information indicative of settings associated with a delegate management connection to be established between the gateway device and the mobile device. The delegate management connection may be established when, as one example, the gateway device is deployed at a location in which the gateway device cannot be managed by the device manager and the mobile device has been brought to or near to the gateway device to manage the gateway device on behalf of the device manager.

The management split key may include three or more key parts, including the gateway key part and the mobile key part, and in at least some of these embodiments, knowledge of at least two, but less than all of the key parts, may be sufficient to decrypt information encrypted in accordance with the management split key.

In a particular implementation, the device management resource may generate a cryptographic key trio, including a third key part, which may be referred to as the recovery key part, in addition to the gateway key part and the mobile key part of the management split key. The three parts of the cryptographic key trio may be configured wherein knowledge of any two of the parts enables recovery of the remaining key part. The operations may include pushing the recovery key part to the gateway device and the mobile device.

The delegated management method may include the use of a second split cryptographic key, referred to herein as the delegate split key, and a second set of metadata, referred to herein as the delegate metadata. One of the key parts of the second split key may be distributed to the gateway device and a second of the key parts may be distributed to a flash drive, such as a portable USB flash drive, or another type of peripheral device. The peripheral device may then present its key part to the gateway device as a means of identifying the peripheral device as a sanctioned subordinate of the mobile device. In embodiments that include a second split key and a second set of metadata, the second split key may be generated by either the device manager, e.g., when the gateway device and mobile device are both under the management of the device manager, or by the mobile device when the gateway device is deployed and out-of-communication with the device manager.

In accordance with disclosed embodiments, a device management method enables a gateway device that is isolated from an enterprise's device management resource, whether premises-based or cloud-based, to recognize a mobile device, and peripheral devices and other subordinates of the particular mobile device, as device management delegates sanctioned by the enterprise's device management resource. Disclosed embodiments may revocably enable the mobile device to deliver trusted policy and setting data to a particular gateway device as if the device management resource were delivering the policy or setting data.

In at least one embodiment, a disclosed device management method, performed at least partially by the mobile device, includes a pre-delegation phase in which a device management resource that has registered or otherwise recognized a particular gateway device and a particular mobile device as managed devices, performs device management operations for or provides device management services to the particular gateway device and to the particular mobile device. Based at least in part upon this a priori trust relationship with both of the devices, the device management resource may generate management metadata, representing data that will enable the gateway device to recognize the particular mobile device as a device management delegate for the particular gateway device.

The device management resource may also generate a multi-part cryptographic key, which may also be referred to as a management split key, a threshold cryptographic key, a split cryptographic key, or a management split key. The management split key includes two or more split key parts where more than one, but less than all of the split key parts are required to decrypt information encrypted using the management split key. The device management resource may encrypt the management metadata using the management metadata, send the encrypted management metadata and the first key part to the gateway device, and send the second key part to the mobile device.

The sending of the encrypted management metadata and the first key part to the gateway device may occur while the gateway device is connected to, registered with, and managed by the device management resource, either before initial deployment or during a subsequent connection with a device management resource. Similarly, the sending of the second key part to the mobile device may occur while the mobile device is connected to, registered with, and managed by the device management resource, again, whether during an initial configuration or during a subsequent management session.

The gateway device, after an initial registration with and configuration by the device management resource, may be relocated to a facility or location that lacks a reliable or highly available Internet connection. In some embodiments, the purpose for which the gateway device is configured and deployed may not require or may not permit a wireless connection traversing a distance of more than a personal area network range, e.g., a range of approximately 10 meters or less associated in accordance with personal area network technologies including, as examples, Bluetooth, Zigbee, or other suitable local wireless protocols or standards. WiFi may qualify as a personal area network technology for purposes of this disclosure, depending upon any range restrictions imposed, despite having a potential range that might exceed a particular range restriction threshold.

After deployment at its intended location in the field, the gateway device may become communicatively isolated from the device management resource and, therefore, incapable of being directly managed by the device management resource. Nevertheless, if or when performing a management task for or with respect to the gateway device is necessary or desirable, the particular mobile device may be employed as a delegate of the device management resource. The gateway device may be enabled to verify that the particular mobile device is a sanctioned management delegate for the particular gateway device.

In at least one embodiment, the mobile device may be brought to the location at which the gateway device is deployed, e.g., by a field service person. Once the mobile device is brought within "local range" of the gateway device, the gateway device may attempt to confirm that the mobile device is a management delegate for the particular gateway device. While the manner in which the gateway device confirms the mobile device as a device management delegate may include the use of cryptographic keys, the particular cryptographic technique employed represents an implementation decision that may be embodied in any of a variety of cryptographic techniques and employing any of a variety of encryption/decryption algorithms.

In at least one embodiment, when a deployed-in-the-field gateway device loses connectivity to the device management resource, whether intentionally or otherwise, the gateway device may be managed by bringing the mobile device within local range of the gateway device. The mobile device may provide the second key part to the gateway device via a local wireless or wireline connection. The gateway device, once in possession of the first key part and the second key part, can successfully decrypt the encrypted management metadata, assuming that the mobile device presenting the second key part is, in fact, the management delegate of the device management resource with respect to this particular gateway.

If the gateway device successfully decrypts the encrypted management metadata, the gateway device may then consume the management metadata, which may instruct the gateway device how to interact with the particular mobile device as a management delegate. The gateway device may acknowledge successful decryption and capture of the management metadata to the mobile device.

In at least one embodiment that employs a flash drive or another type of peripheral device in conjunction with the remote management session, the mobile device may generate or access a second split key, which may also be referred to herein as the delegate split key. The second split key, like the first split key, may include a first key part, a second key part, and one or more optional additional key parts. The mobile device may send the first key part of the second split key to the gateway device and the second key part of the second split key to the peripheral device. When the peripheral device is subsequently plugged into or otherwise attached, connected, or coupled to the gateway device, the peripheral device may forward the second key part of the second split key to the gateway device. With access to the first and second split key pairs of the second split key, the gateway device may then verify the peripheral device as a subordinate of the management delegate and proceed. This verification may include decrypting and consuming the second metadata. Upon successful authentication of the mobile device by the gateway device, the mobile device may then provide a managerial resource including, as non-limiting examples, a flash memory device or a keyboard or other form of human I/O device, to manage the gateway device or to enable an administrator to perform a managerial function for the gateway device.

Authentication code executing in one or both of the two devices may perform encryption, decryption, and/or other types of operations as part of the authentication. The mobile device may be provisioned with multiple second key parts corresponding to multiple split keys, in which case, a single mobile device may serve as trusted management delegate for multiple different gateway devices.

As previously mentioned, authenticating the mobile device to the gateway device may be followed by the mobile device generating or accessing a second split key and pushing or otherwise sending a first key part of the second split key, referred to herein as the first key part of the second split key, to the gateway and pushing or otherwise sending a second key part of the second split key, referred to herein as the peripheral key part, to a peripheral device that is or may be connected to the gateway device to a delegated management function. The peripheral key part of the second split key may enable the peripheral device to convey its authenticity as a management delegate to the gateway device.

The first key part of the second split key may include instructions or other data that configure, constrain, or otherwise influence the trusted connection between the gateway device and the peripheral device. The gateway key part may, for example, define a gateway device I/O port, a permitted device type, and a time window associated with the trusted connection with the peripheral device.

For embodiments in which the peripheral device is a flash memory device configured with a firmware update, the flash memory device may include, in addition to firmware updates, executable code or instructions that cause a processor of the gateway to store, install, execute, or otherwise implement the firmware update. In at least one embodiment, the peripheral key part of the second split key may include login information enabling the peripheral device to log into the gateway device following authentication.

In accordance with other embodiments of the present disclosure, an information handling system, suitable for use as a mobile device, may be identified as a management delegate to manage a gateway or another type of device that is communicatively isolated from a device management server or service. The information handling system may feature a processor and a computer readable storage medium including processor executable instructions that, when executed by the processor, result in operations including receiving, via a management connection between the mobile device and a device manager, a first key part of a first split key from the device manager and providing the mobile key part of the management split key to a gateway device communicatively isolated from the device manager. The mobile key part may enable the gateway device to authenticate or otherwise recognize or identify the mobile device as a device management delegate sanctioned by the device manager to perform delegated management of the gateway device. The mobile device may receive or detect an acknowledgement, from the gateway device, indicating the gateway device's recognition of the mobile device as the device management delegate sanctioned by the device manager. The mobile device may then perform a delegated device management operation to manage the gateway as a trusted delegate of the device management resource.

Providing the mobile key part may include the mobile key part via a local connection between the gateway device and the mobile device, e.g., a personal area network connection, i.e., a connection via a personal area network protocol or technology. The personal area network connection may be defined, in some embodiments, as a connection with a range of less than approximately 20 meters and, further defined, in some embodiments as a connection with a range of less than 10 meters.

The delegated device management operation may include operations for updating a configuration of the gateway device. The gateway configuration may include gateway device settings and gateway device firmware. In some embodiments, updating the configuration may include enabling a peripheral device to deliver update information to the gateway device. Enabling the peripheral device to deliver the update information may include accessing a second split key and encrypted delegate metadata, i.e., delegate metadata encrypted in accordance with the second split key and sending a first part of the second split key and the encrypted delegate metadata to the gateway device. A second part of the second split key may be sent to the peripheral device. The second part of the second split key, in combination with the first part of the second split key, may be sufficient to decrypt the encrypted delegate metadata. The delegate metadata may include information identifying the peripheral device or information indicative of limitations the gateway device is to enforce and privileges the gateway device is to honor with respect to the mobile device.

In accordance with still other disclosed embodiments, an information handling system functioning as the management resource suitable for use in performing one or more operations of a management method includes a processor and a computer readable medium including program instructions that, when executed by the processor, cause the processor to perform program operations including: (a) device management operations for managing information handling system assets associated with an enterprise and (b) management delegation operations. The management delegation operations may include: generating a first split key including a first key part and a second key part, sending the first key part to a gateway device, and sending the second key part to an original mobile device. The first split key may be generated in a manner that enables the gateway device to authenticate or reject a candidate mobile device providing a candidate string as the second key part of the first split key.

The management delegation operations may include providing the mobile device with a management delegation application that, when executed, enables the mobile device to generate a second split key, including a first key part and a peripheral key part. The peripheral key part, when provided to the first key part, may enable the first key part to authenticate the peripheral key part as a trusted peripheral device. The first key part may define a gateway device I/O port over which the peripheral device, if authenticated, can communicate data, a peripheral device type indicating a type of peripheral device that, if authenticated, can communicate with the gateway device, and a time window during which the peripheral device, if authenticated, can communicate data.

Technical advantages of the present disclosure may be readily apparent to one skilled in the art from the figures, description, and claims included herein. The objects and advantages of the embodiments will be realized and achieved at least by the elements, features, and combinations particularly pointed out in the claims.

It is to be understood that both the foregoing general description and the following detailed description provide examples for explanatory purposes and that the examples provided are not restrictive of the claims unless expressly recited therein.

BRIEF DESCRIPTION OF THE DRAWINGS

A more complete understanding of the presented embodiments and advantages thereof may be acquired by referring to the following description taken in conjunction with the accompanying drawings, in which like reference numbers indicate like features. All drawing figures not expressly identified as prior art encompass and accord with one or more embodiments of inventions disclosed herein.

DETAILED DESCRIPTION

Figure 1A:
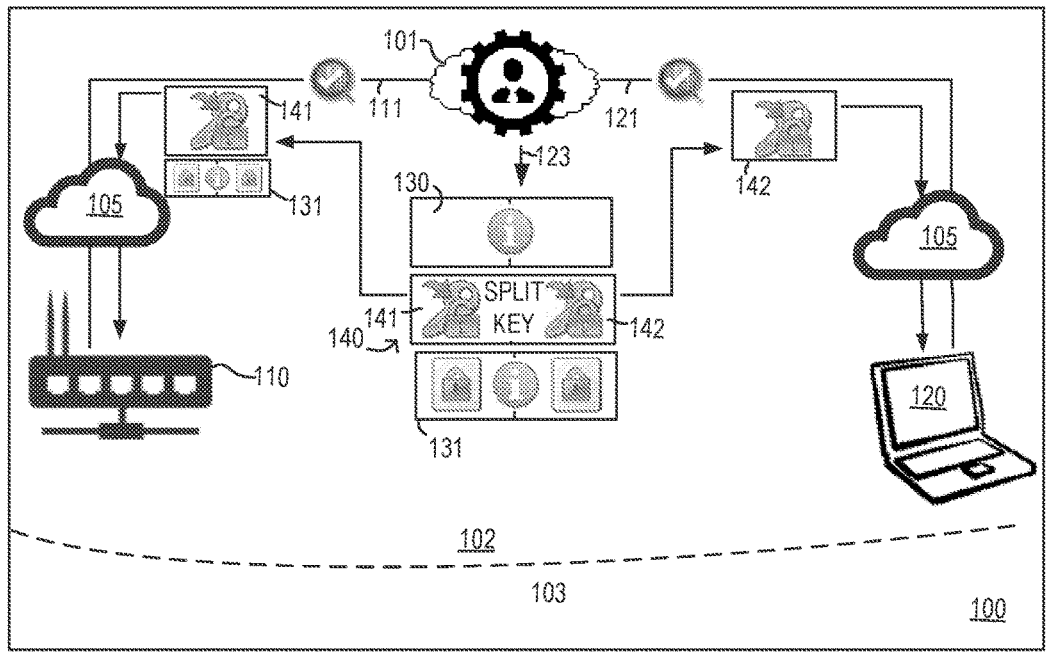
FIG. 1A illustrates a platform for implementing a device management delegation process at an initial stage.

Preferred embodiments and their advantages are best understood by reference to FIGS. 1A, 1B, 1C and 2-6, wherein like numbers are used to indicate like and corresponding elements or operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

For purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For purposes of this disclosure, a resource may refer to functionality provided as a service by way of an information handling system instance, but generally not associated with any specific information handling system from the perspective of the recipient or consumer of the functionality or service. Cloud-based resources, for example, may include computational services or functionality available via any one of two or more information handling systems and provided by an information handling system instance selected by the service provider and transparent to the recipient.

FIG. 1A illustrates a device management platform 100 that enables a device management resource 101 to manage, provision, or otherwise configure a mobile device 120 as a device management delegate authorized to perform a device management function or to provide a device management component or resource to a particular gateway device or another device that is isolated from device management resource 101.

Figure 1B:
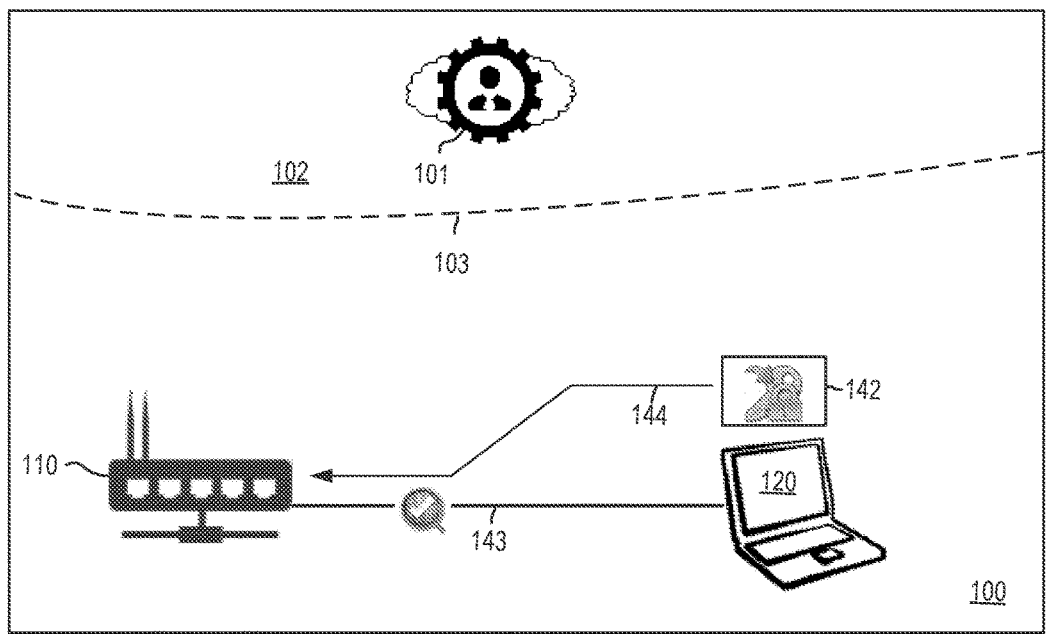
FIG. 1B illustrates the platform of FIG. 1A at a second stage.
Figure 1C:
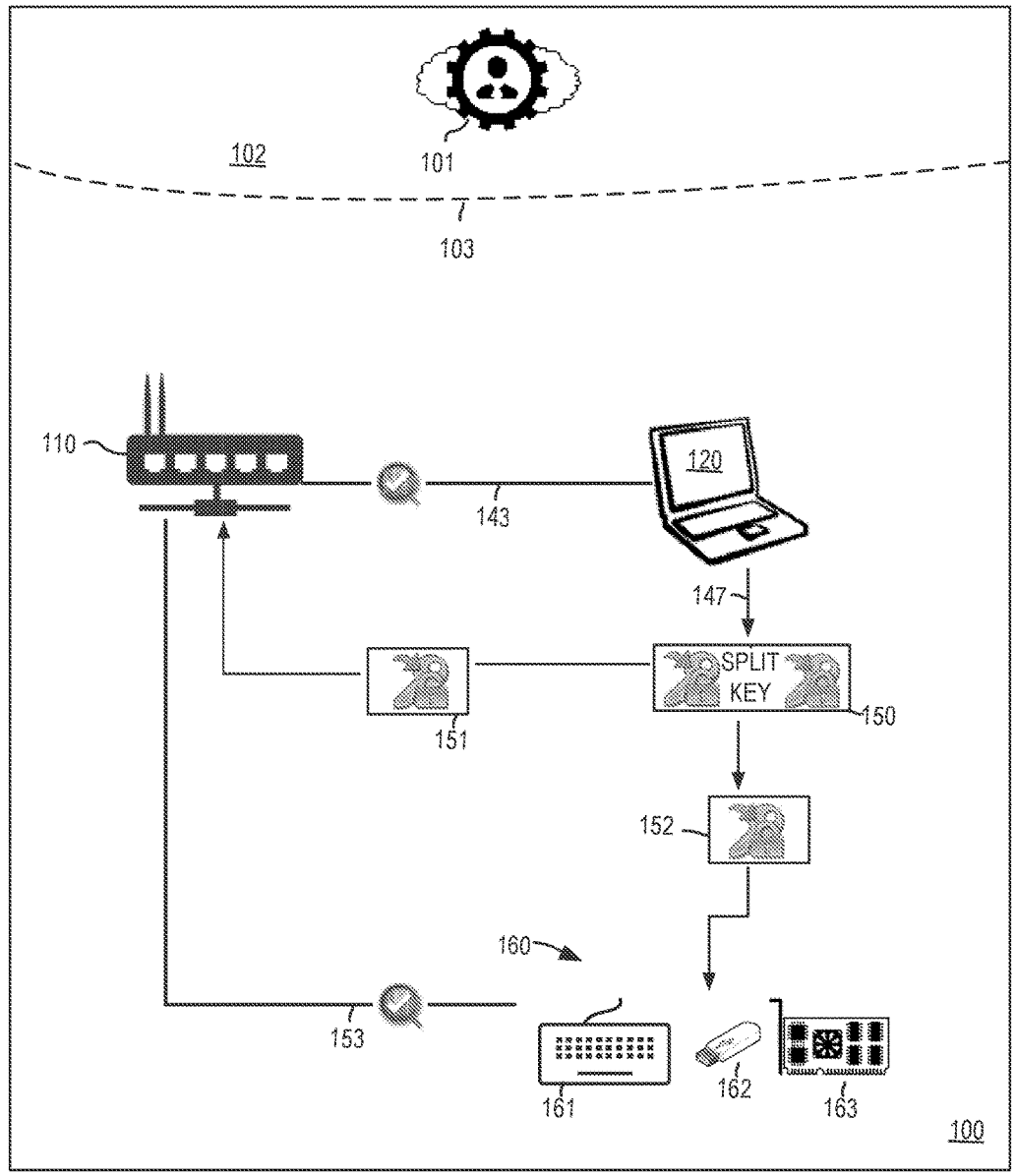
FIG. 1C illustrates the platform of FIG. 1A at a third stage.
Figure 2:
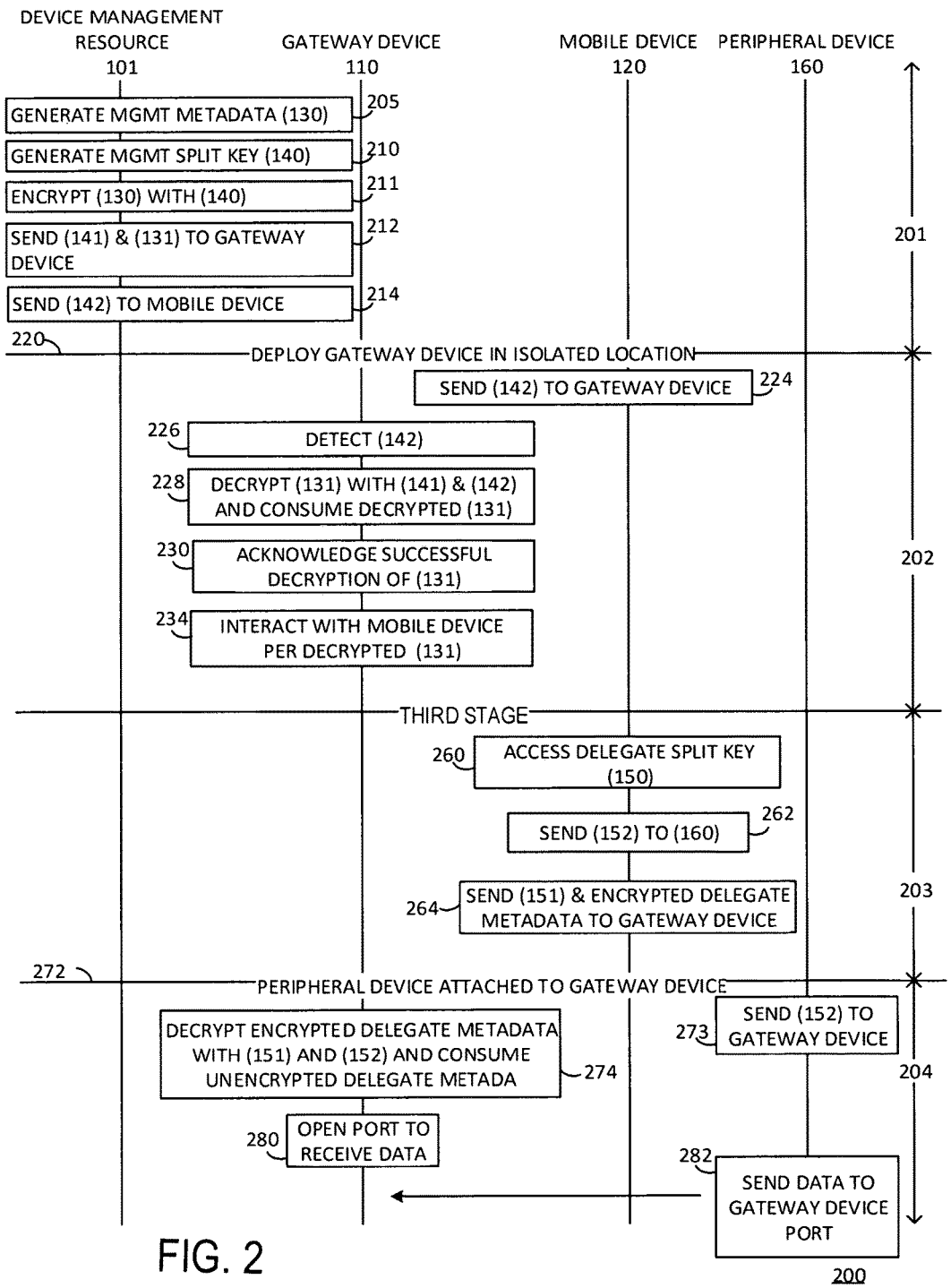
FIG. 2 illustrates a device management delegation process including a plurality of communications among elements of a device management delegation platform.

The device management delegation features of the management platform 100 described with respect to FIG. 1A through FIG. 1C, as well as the device management delegation process 200 described with respect to FIG. 2 are both subject to a precondition of a priori trust established between device management resource 101, gateway 110, and the mobile device 120. It is assumed throughout that gateway 110 and mobile device 120 communicate across a private channel, using, as an example, Transport Layer Security (TLS)-compliant communication, based on identities managed by device management resource 101. Because an existing trust relationship is an assumed prerequisite, descriptions of cryptographic elements, including the cryptographic split keys and their corresponding key part, are largely confined to the use of such elements as a means for enabling the gateway to (1) recognize a properly sanctioned mobile device as a delegate of the device manager to which the gateway is subscribed and (2) securely convey delegated device management code and data as well as any policies or restrictions pertaining to the delegated device management process. The specific cryptographic mechanism by which management split key 140 enables or supports these objectives is an implementation detail that may encompass any of a number of suitable encryption/decryption authentication mechanisms and algorithms. At least one example cryptographic implementation is illustrated in the figures described below.

Device management resource 101 may be implemented as an enterprise-class device management solution for managing information handling system assets, whether owned by the enterprise or by an employee or other end user. Functionality supported by device management resource 101 may include over-the-air installation, distribution, and upgrades of enterprise and personal applications, data, and configuration settings for a diverse mix of information handling system types including any suitable type of mobile device.

In at least one embodiment, device management resource 101 encompasses server-side functionality of a device management solution that includes, as a client-side component, a device management application (not depicted in FIG. 1A) resident on some or all managed devices. Device management resource 101 may send out device management commands to a managed device and the client-side device management application may receive and implement the management commands.

In at least some embodiments, device management resource 101, in conjunction with the device management application, may segregate enterprise data from personal data on the managed device and encrypt email, documents, enterprise applications, and other enterprise data.

FIG. 1A illustrates device management resource 101 implemented as a cloud-based resource that enables an enterprise to securely manage mobile devices and other information handling system assets over the air from substantially any location. The cloud-based device management resource 101 illustrated in FIG. 1A may support advanced features including enterprise-controlled self-service provisioning by users, asset inventory tracking, device usage monitoring, policy compliance enforcement, and end user access to remote desktops, applications and content. Cloud-based embodiments of device management resource 101 may include or support at least some features included in or supported by the Client Cloud Manager service/resource from Dell Inc.

In at least one embodiment, the gateway device 110 depicted in FIG. 1A represents a headless device, i.e., a device that lacks a keyboard, mouse, display screen, touch pad, touch screen, speaker, microphone, or other form of human-useable I/O device. Commonly deployed at a remote location or facility and tasked to provide a particular function within an industrial, manufacturing, or another specialized environment, gateway device 110 may operate, whether intentionally or otherwise, beyond the territorial reach of device management resource 101. For example, gateway device 110 may function in a remote environment that lacks access to the Internet or other suitable network for communicating data. Recognizing that gateway device 110 may operate beyond the management reach of device management resource 101, platform 100 supports post-deployment management of gateway device 110 using mobile device 120 as a device management proxy referred to herein as a device management delegate.

FIG. 1A illustrates platform 100 at an initial stage of a device management delegation process. In the initial stage depicted in FIG. 1A, gateway device 110 and mobile device 120 are both illustrated as being located within a hypothetical region identified as a device management jurisdiction 102 that is demarcated in FIG. 1 by an imaginary boundary 103. Device management jurisdiction 102 is a conceptual representation of locations where a reliable connection with device management resource 101 may be maintained.

FIG. 1A illustrates a device management connection 111 between device management resource 101 and gateway device 110 and a device management connection 121 between device management resource 101 and mobile device 120. The device management connections 111 and 121 convey that device management resource 101 has established a trusted relationship with gateway 110 and mobile device 120 prior to implementing delegated management features described herein. One characteristic of the trusted relationships represented by device management connections 111 and 121 is that device management resource 101 can verify the identity of the device or resource with whom the device management resource is communicating and, conversely, gateway device 110 and mobile device 120 can each verify the identity of device management resource 101.

Because the illustrated device management resource 101 is a cloud-based resource, the device management connections 111 and 121 illustrated in FIG. 1A are networked connections that span at least some portion of the Internet 105. In embodiments (not depicted) that include a premises-deployed device management resource, device management connections that do not span the Internet or traverse any logical or physical firewall may be employed. In either of these embodiments, device management connections may include one or more wireless segments, one or more tangible media segments, including copper, co-axial, and optical fiber media segments, or both.

With device management connections 111 and 121 established and with gateway device 110 and mobile device 120 both within its device management jurisdiction 102, the device management resource 101 illustrated in FIG. 1A begins one embodiment of a management delegation process by generating, obtaining, or otherwise accessing (operation 123) management metadata 130 and a composite or split cryptographic key alternatively referred to herein as either management split key 140 or first split key 140. Device management resource 101 generates or obtains encrypted metadata 131 by encrypting management metadata 130 using management split key 140. The management split key 140 illustrated in FIG. 1A includes a first key part 141, sometimes referred to herein as gateway key part 141, and a second key part 142, sometimes referred to herein as mobile key part 142.

Management metadata 130 represents and includes information that will enable gateway device 110 to recognize a sanctioned delegate of device management resource 101 when that delegate attempts to initiate a management session with gateway device 110 as described below with respect to FIG. 2. Management metadata 130 may include information identifying or otherwise pertaining to mobile device 120. Management metadata 130 may include public or readily accessible information pertaining to mobile device 120 including, as non-limiting examples, a serial number, MAC address, SIM card number, and the like. Management metadata 130 may also include information pertaining to mobile device 120 that arises as a result of the trusted relationship between mobile device 120 and device management resource 101, but is not otherwise publically accessible. As an example, device management resource 101 may assign each device that it manages a registration number that is unique to the managed device, and, in this case, the device management registration number may be included in managed metadata 130.

FIG. 1A depicts device management resource 101 pushing or otherwise sending gateway key part 141 of management split key 140, with the encrypted metadata 131, to gateway device 110. FIG. 1A further depicts device management resource 101 sending mobile key part 142 of management split key 140 to mobile device 120. Mobile key part 142 of management split key 140 may function as an electronic admission ticket by including information or data that enables a particular gateway device 110 to recognize mobile device 120 as the particular mobile device that device management resource 101 designated as the management delegate for the particular gateway device. In addition to mobile key part 142, mobile device 120 may include device management information including, as non-limiting examples, device management software, policies, rules, and so forth that mobile device 120 might invoke, install, or establish as the delegated device manager for gateway device 110.

FIG. 1B illustrates platform 100 at a second stage of the device management delegation process in which gateway device 110 has been installed or otherwise deployed outside of the management jurisdiction 102 of device management resource 101. Located on an exterior side of device management boundary line 103, the gateway device 110 illustrated in FIG. 1B cannot or does not communicate with device management resource 101 and cannot, therefore, be managed by device management resource 101. To provide device management support for gateway device 110 when gateway device 110 is communicatively inaccessible to or otherwise electronically isolated from device management resource 101, FIG. 1B illustrates mobile device 120 and gateway device 110 establishing a trusted remote device management connection 143 that enables mobile device 120 to perform selected device management functions or provide selected device management resources to gateway device 110 as a management delegate of device management resource 101.

Establishing the trusted remote device management connection 143 may include mobile device 120 presenting mobile key part 142 to gateway device 110 as a form of electronic admission ticket or authority to perform delegated management functions for gateway 110 on behalf of device management resource 101. Mobile device 120 may present mobile key part 142 to gateway device 110 wirelessly by broadcasting or otherwise sending (operation 144) mobile key part 142 to gateway device 110 using a wireless personal area network technology or standard. In at least one such embodiment, the wireless technology employed may comply with a low power, limited range technology, e.g., a technology specifying a range of less than approximately 20 meters and, in still other embodiments, a range of less than approximately 10 meters. In other embodiments, mobile device 120 may present mobile key part 142 over a wireline connection including, as an example, a USB cable or the like. Mobile device 120 may also broadcast mobile key part 142 wirelessly.

Gateway device 110 may detect mobile key part 142 and attempt to decrypt the encrypted management metadata 131 using mobile key part 142 in combination with gateway key part 141. If gateway device 110 successfully decrypts encrypted management metadata 131 and determines that the mobile device 120 which presented second key part 142 matches the mobile device identified in the un-encrypted management metadata, gateway device may conclude, at an acceptable level of certainty, that mobile device 120 is the device delegated by device management resource 101 to perform delegated device management of gateway device 110.

FIG. 1C illustrates a third stage of the device management delegation process in which mobile device 120 generates, obtains, or otherwise accesses (operation 147) a second split key 150, also referred to herein as delegate split key 150, that includes a gateway key part 151, sometimes referred to herein as gateway key part 151, and a peripheral key part 152, sometimes referred to herein as peripheral key part 152. In at least one embodiment, mobile device 120 pushes or otherwise transmits gateway key part 151 to gateway device 110 and pushes or otherwise transmits peripheral key part 152 to a smart peripheral device 160.

In some embodiments, smart peripheral device 160 represents a peripheral device that includes, at a minimum, storage sufficient to store peripheral key part 152 and sufficient functional or processing capability to push or otherwise transmit peripheral key part 152 over either a local connection or a networked connection. The smart peripheral device 160 is represented by a smart keyboard 161, a flash drive 162, and a graphics adapter 163, all of which may be compatible with USB or another suitable peripheral bus. In these examples, smart keyboard 161 and graphics adapter 163 may be intended to provide human-useable I/O interfaces for headless embodiments of gateway device 110, while flash drive 162 may be intended to install or update gateway firmware, configuration data, policies, etc. Gateway device 110 may include firmware, i.e., data and executable code, stored in flash memory or another suitable non-volatile memory device, that is typically executed or loaded into gateway device memory during a gateway device boot sequence. In at least one such embodiment, peripheral device 162 may include firmware updates for gateway device 110.

Peripheral key part 152 of second split key 150 may enable gateway device 110 to recognize smart peripheral device 160 as a device management subordinate of a trusted mobile device 120 when smart peripheral device 160 is connected to gateway device 110. In this manner, gateway device 110 and smart peripheral device 160 may establish a trusted connection 153 between them.

In addition to cryptographic information, smart peripheral device 160 may also include information defining or constraining the trusted connection 153. As non-limiting examples, peripheral device 160 may include data and/or code indicating any one or more of: a particular port with which trusted connection 153 may be established, a particular device type with which gateway device 110 may establish trusted connection 153, and a particular window or interval of time during which the trusted connection is permitted. The window of time may be specified explicitly, e.g., between 1:00 PM and 2:00 PM CST on 24 Feb. 2016, or relative to one or more triggering events, e.g., within 2 hours of receiving gateway key part 151 AND within 1 hour of detecting smart peripheral 160 being connected to gateway device 110. In other embodiments, some or all of this additional information may be included in the encrypted management metadata 131 sent to gateway device 101 by device management resource 101 (FIG. 1A).

FIG. 2 illustrates a delegated management process 200 for employing a mobile device 120 as a management delegate of a device management resource 101 to manage a communicatively-isolated gateway device 110.

Consistent with the various stages illustrated in FIG. 1A, FIG. 1B, and FIG. 1C, the delegated management process 200 illustrated in FIG. 2 includes an initial stage 201 during which mobile device 120 and gateway device 110 are within the management domain of their device management resource 101.

In the delegated management process 200 illustrated in FIG. 2, device management resource 101 constructs (operation 205) management metadata for gateway device 110. The management metadata may include data that will enable gateway device 110 to recognize a key part received from a mobile device as conclusive evidence that the mobile device is the management delegate designated by device management resource 101. The management metadata may include, as a non-limiting example, information indicative of a particular mobile device, including, but not necessarily limited to information uniquely indicative of a particular mobile device and information that may not be known or knowable beyond the trusted relationships device management resource 101 has established with both devices.

The delegated management method 200 illustrated in FIG. 2 includes device management resource 101 generating (operation 210) management split key 140, which includes first key part 141 and second key part 142.

In general, a split key, K(M,N), is said to be an (M,N)-threshold key, where M and N are positive integers, when the split key K has N key parts, any M of which, in combination, are sufficient to decrypt messages encrypted with K. In at least one embodiment, management split keys described herein may be (2,3)-threshold keys, where the key includes three key parts and where any two of the key parts is sufficient to decode a key-encrypted message and wherein encrypted data may be recovered despite the loss of any one key part. Although FIG. 2 and the accompanying description may refer to or suggest (2,2)- or (2,3)-threshold cryptography, other embodiments may encompass (2,N)-threshold cryptography more generally, where N>2, or (M,N)-threshold cryptography where N>2 and 1<M<N.

Returning to the delegated management process 200 of FIG. 2, device management resource 101 may encrypt (operation 211) management metadata 131 with management split key 140 and push or otherwise send (operation 212) first key part 141 and the encrypted management metadata 131 to gateway device 110, which may store first key part 141 and encrypted management metadata 131 in gateway device storage or memory. Device management resource 101 may also push or otherwise send (operation 214) second key part 142 to mobile device 120, which may store second key part 142 in mobile device storage or memory.

The delegated management process 200 illustrated in FIG. 2 transitions to second stage 202 after gateway device 110 is deployed (operation 220) at an isolated location, e.g., a location where no wireless or wireline connection with device management resource 101 is available.

In some embodiments, the communication isolation of gateway device 110 may be intentional for security or other reasons. For example, gateway device 110, after installation and/or deployment at its deployed location, may disable its wireless wide area network or cellular communication interface(s) to prevent communication extending beyond a particular radius, e.g., 10 meters, 20 meters, or another suitably low radius. In some embodiments, personal area network communication interfaces with a range of less than the particular radius may be maintained to enable gateway device 110 to perform any control or monitoring functions with which it has been tasked. Gateway device 110 may, for example, communicate wirelessly with a group of sensors (not depicted) via a low bandwidth protocol including, as non-limiting examples, Bluetooth and Zigbee, to monitor various parameters of a particular process, system, facility, or the like.

Because gateway device 110, once deployed, may lack a communication connection with device management resource 101, second stage 202 of the delegated management process 200 illustrated in FIG. 2 proceeds independent of the availability of a communication connection between device management resource 101 and gateway device 110. In some embodiments, the lack of a device management connection may even be a prerequisite to receiving device management from a device management delegate.

In second stage 202 of the delegated management process 200 illustrated in FIG. 2, mobile device 120 is located sufficiently close to the deployed gateway device 110 to permit wireless communication via a personal area network protocol or wireline communication using, as examples, a USB cable or a CAT-5, or higher, patch cord. In at least one exemplary embodiment, mobile device 120 may be a laptop or tablet computer associated with an engineer, technician, or enterprise IT administrator.

After mobile device 120 is brought within an acceptable range of gateway device 110, the delegated management process 200 illustrated in FIG. 2 includes mobile device 120 sending (operation 224) the second key part 142 to gateway device 110. Mobile device 120 may, for example, include and execute a delegated device management application program that broadcasts or otherwise transmits second key part 142 of management split key 140 automatically or in response to input from a technician or other user.

In some embodiments, mobile device 120 may send second key part 142 to gateway device 110 wirelessly by broadcasting, for example, the second key part 142 via a predetermined WiFi network name (SSID) using a predetermined passcode. In other embodiments, mobile device 120 may transmit second key part 142 using a suitable low bandwidth or personal area network protocol. In still other embodiments, mobile device 120 may provide the second key part 142 via a USB cable or another suitable wireline connection between mobile device 120 and gateway device 110.

Gateway device 110 may detect (operation 226) second key part 142 by polling or otherwise monitoring a wireless interface to detect any data or messages transmitted by mobile device 120. Upon detecting second key part 142, gateway device 110 may then decrypt (operation 228) the management metadata using a combination of first key part 141 and second key part 142 and consume or otherwise access the management metadata. The management metadata may instruct or inform gateway device 110 of parameters pertaining to the gateway device's interaction with mobile device 120 during delegated management sessions. After successfully decrypting the management metadata and successfully consuming the management metadata, the gateway device 110 illustrated in FIG. 2 acknowledges (block 230) the successful decryption and consumption of the management metadata. The acknowledgment of successful consumption and decryption may be sent to mobile device 120 to acknowledge mobile device 120 as the delegated device management resource. The gateway device 110 may then interact (block 234) with mobile device 120 in accordance with any restrictions or privileges indicated by the management metadata or elsewhere.

Continuing with FIG. 2, a third stage 203 of the illustrated delegated management process 200 includes mobile device 120 accessing (operation 260) a second split key 150, which may be of the same cryptographic construct type as first split key 140 and which may include a gateway key part 151 and a peripheral key part 152. In some embodiments, second split key 150 may be generated by mobile device 120 in response to the acknowledgement (operation 230) from gateway device 110. In other embodiments, second split key 150 may be generated by device management resource 101 during initial stage 201 and stored in mobile device 120 when device management resource 101 sends second key part 142 of the first split key 140 to mobile device 120.

The delegated device management process 200 illustrated in FIG. 2 includes mobile device 120 sending peripheral key part 152 to peripheral device 160 (operation 262). For embodiments in which mobile device 120 generates second split key 150, mobile device 120 may also send (operation 264) gateway key part 151 and encrypted delegate metadata to gateway device 110. Analogous to the management metadata 130 previously described, delegate metadata may include information identifying the smart peripheral device 160 to be attached to or otherwise coupled to gateway device 110 during delegated management of gateway device 110.

For embodiments in which second split key 150 is generated by device management resource 101, gateway key part 152 of second split key 150 may be sent to gateway device 110 by device management resource 101 when device management resource 101 sends gateway key part 141 of first split key 140 to gateway 110.

Peripheral device 160 may store the peripheral key part 152 in peripheral device storage (operation not explicitly depicted). After receiving and storing peripheral key part 152, peripheral device 160 may be attached (operation 272) to or otherwise connected to gateway device 110.

Smart peripheral device 160 may include, in addition to peripheral key part 152, update information including data and executable instructions that may be uploaded to gateway device 110 for storage in or execution by gateway device 110. In addition, smart peripheral device 160 may include connection information pertaining to parameters of and constraints on any delegated device management connection that gateway device 110 may establish with gateway device 110. The connection information may indicate, as non-limiting examples, a particular communication port, a particular type of peripheral device, or a window of time during which a delegated device management connection is authorized. In some embodiments, some or all of the connection information may be generated by device management resource 101 during initial stage 201 and stored in the management metadata provided to gateway device 110 by mobile device 120.

After peripheral device 160 is connected (operation 272) or otherwise coupled to gateway device 110 at the beginning of a final stage 204, smart peripheral device 160 may send (operation 273) peripheral key part 152 to gateway device 110. Gateway device 110 may then use the peripheral key part 152, in combination with the gateway key part 151 of second split key 150, to decrypt (operation 274) the encrypted delegate metadata and access or otherwise consume the unencrypted delegate metadata to verify the smart peripheral device 160 as a subordinate of mobile device 120 and device management resource 101. If the decryption of delegate metadata is successful, gateway device 110 may then interact with the smart peripheral device 160 and thereby be managed by a device management delegate of device management resource 101. As illustrated in FIG. 2, the interaction with the device management delegate may include gateway device 110 opening (block 280) a serial port, e.g., a designated USB port, and receiving data sent (operation 282) by smart peripheral device 160.

In the example of keyboard 161 as peripheral device 160, the opening of the applicable port by gateway device 110 enables keyboard 161 to transmit data corresponding to user keystrokes to gateway device 110. In the case of a flash drive 162 or other storage device capable of delivering firmware update data and firmware update instructions or code corresponding to a firmware update, opening the port enables gateway device 110 to receive the firmware update data and to execute the firmware update instructions to update the gateway device firmware.

Figure 3:
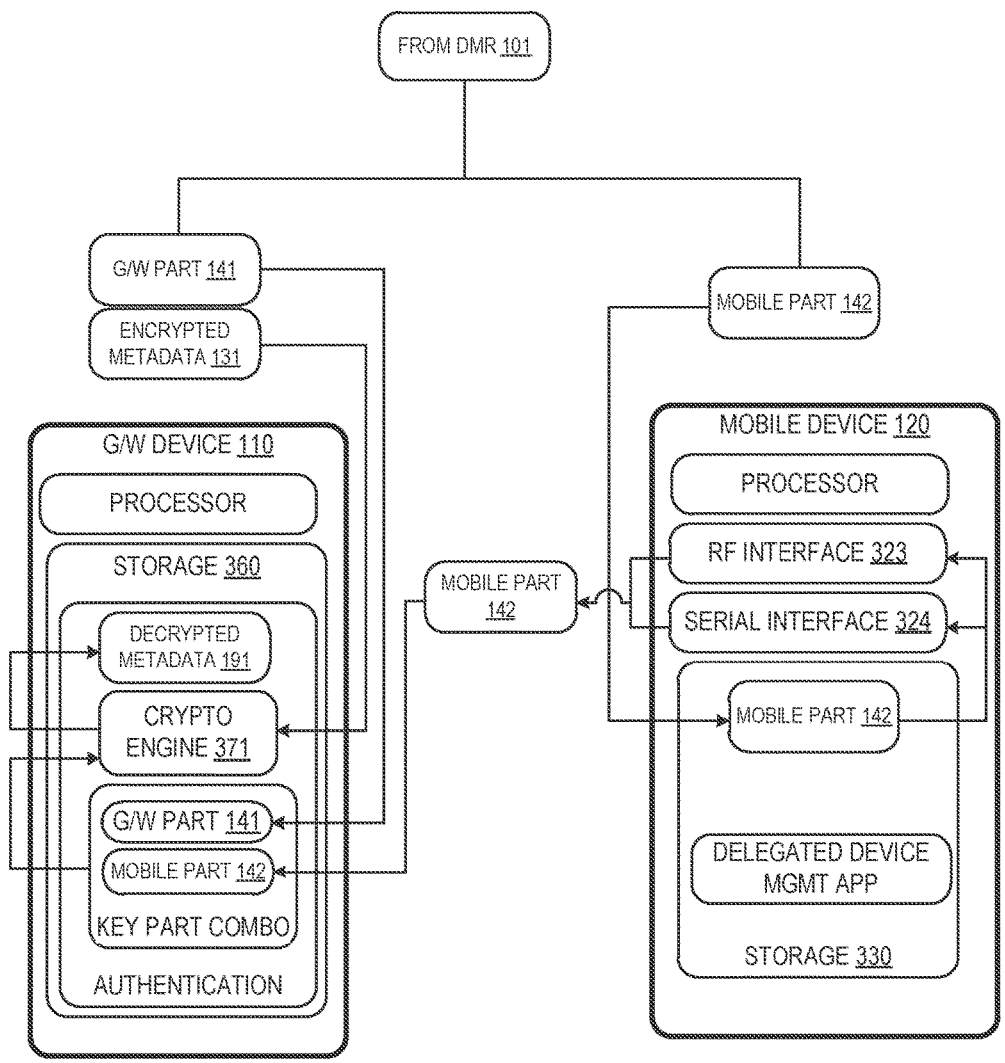
FIG. 3 illustrates a mobile device establishing itself as a device management delegate for a gateway device.

FIG. 3 illustrates gateway device 110 recognizing mobile device 120 as a sanctioned delegate of a device management resource using a multipart cryptography. FIG. 3 illustrates mobile key part 142 being provided to mobile device 120 from device management resource 101 and gateway key part 141 and encrypted metadata 131 being provided to the gateway device 110 from the device management resource 101. FIG. 3 illustrates mobile device 120 storing mobile key part 142 in mobile device storage 330 and sending, by a local connection comprising either the radio frequency (RF) interface 323, i.e., wireless interface 323, or serial interface 324, mobile key part 142 to gateway device 110.

Gateway device 110 receives mobile key part 142 via an interface (not depicted in FIG. 3) and stores the mobile key part 142 in storage 360 of gateway device 110, along with gateway key part 141, which gateway device 110 received from device management resource 101.

A cryptographic engine 371 of gateway device 110 may then use gateway key part 141 in combination with mobile key part 142 as a key that enables cryptographic engine 371 to decrypt the encrypted management metadata 131 and thereby obtain decrypted management metadata 191 as shown.

Figure 4:
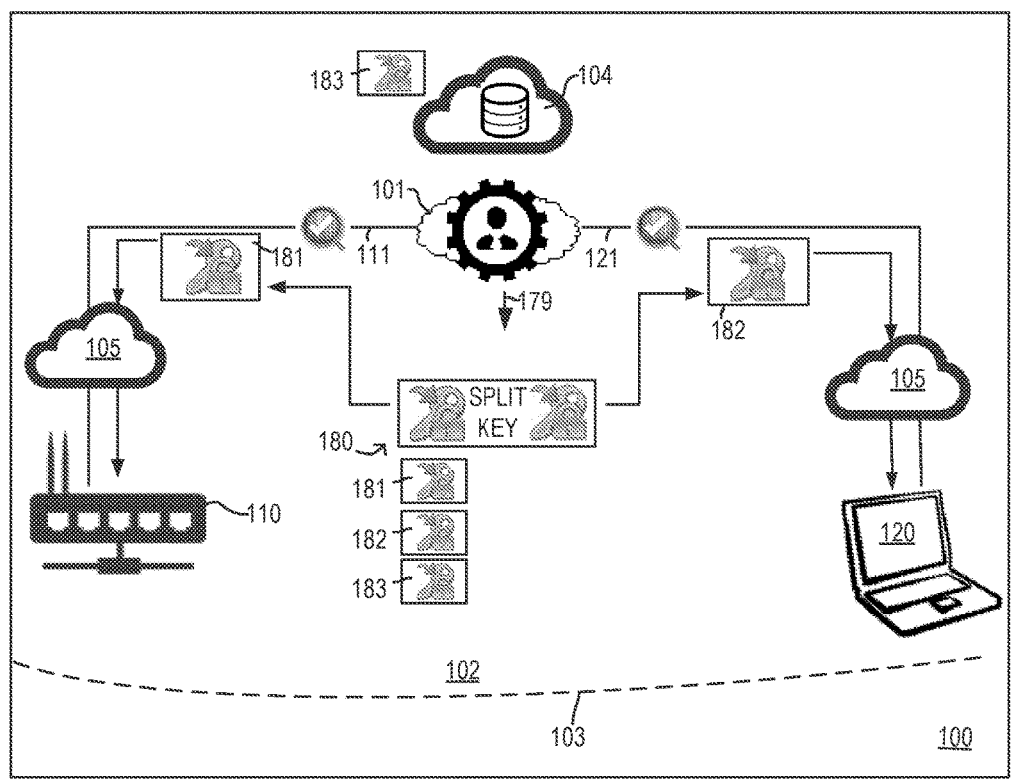
FIG. 4 illustrates a multipart key construct example.

FIG. 4 illustrates a multipart key or split key construct example in which the split key includes three key parts, including the gateway key part and mobile key part discussed above, as well as a third key part for data recovery. Device management resource 101 generates (operation 179) a split key 180 that includes three key parts 181, 182, and 183. The device management resource 101 distributes the first key part 181 to gateway device 110 and the second key part 182 to mobile device 120 analogous to the sending of gateway key part 141 to gateway device 110 and mobile key part 142 to mobile device 120. The third key part 183, however, is not distributed to either the gateway device 110 or the mobile device 120. Instead, device management resource 101 stores the third key part 183 in cloud-based storage 104, which is accessible to device management resource 101. Gateway device 110 can decrypt information encrypted with the split key 180 without ever accessing third key part 183 as long as gateway 110 has access to first key part 181 and second key part 182. However, in the event that first key part 181 or second key part 182 becomes corrupted, lost, or otherwise inaccessible, third key part 183 may be retrieved from cloud-based storage 104 and used in conjunction with the remaining uncorrupted key part to decrypt data encrypted with the split key 180. More generally, a split key may include 3 or more key parts where 2 or more, but less than all of the key parts are sufficient to decrypt messages encrypted with the split key.

Figure 5:
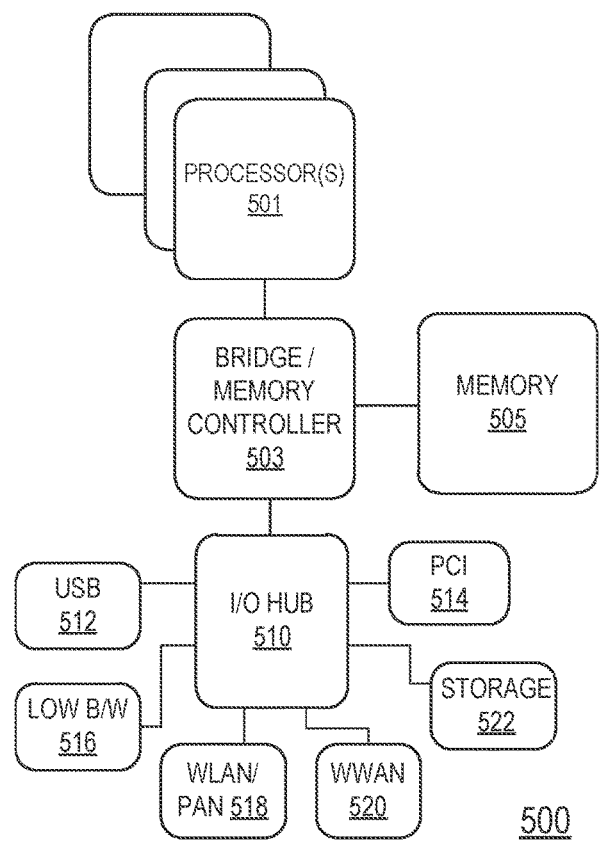
FIG. 5 illustrates a block diagram of an exemplary information handling system suitable for use as a gateway device or device management server.

FIG. 5 illustrates elements of an information handling system 500 that may be suitable for use as gateway device 110 or a server that implements device management resource 101, whether the server is a specific premises-installed server or the physical server instantiation of a cloud-based virtual device management server. The information handling system 500 illustrated in FIG. 5 includes one or more general-purpose processors 501 coupled to a bridge/memory controller 503. Bridge/memory controller 503 controls a memory 505 and communicates with an I/O hub 510. Consistent with a data conduit function that a gateway device may perform in a particular configuration, the I/O hub 510 of the information handling system 500 illustrated in FIG. 5 supports a diverse set of I/O controllers and adapters.

The I/O hub 510 of FIG. 5 includes a USB controller 512 for high-speed serial communication, a PCI controller 514 for communication with PCI devices, and a low bandwidth controller 516 for providing low bandwidth protocols including, as examples, LPC, SPI, and I2C. A WLAN/PAN controller 518 provides support for various local and personal area network protocols while a WWAN controller 520 provides support for GSM and/or CDMA communication. The information handling system 500 of FIG. 5 further includes a storage adapter 522 that supports one or more mass storage protocols including, as examples, SCSI, SATA, and NVMe. Any of the elements shown in FIG. 5 may encompass two or more distinct controllers or adapters. Conversely, any group of two or more elements shown separately in FIG. 5 may be integrated within a single semiconductor device, chip set, or printed circuit board.

Characteristic of at least some headless gateway devices, the information handling system 500 of FIG. 5 reflects an absence of conventional human I/O adapters and controllers including an absence of video/graphics adapters, keyboard, mouse, and touchpad controllers, microphone and speaker transducers, or an audio codec. Other embodiments of information handling system 500 may include any or all of these elements.

Figure 6:
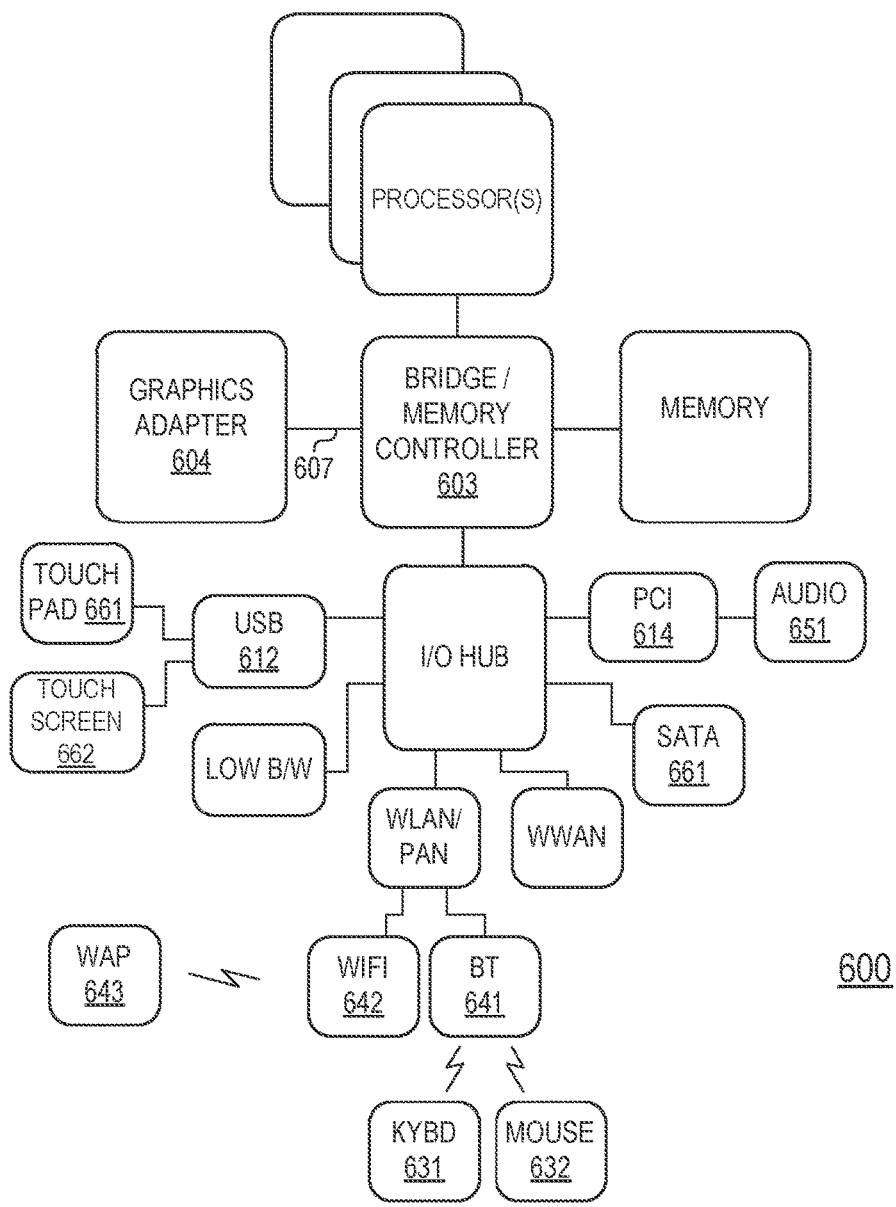
FIG. 6 illustrates a block diagram of an exemplary information handling system suitable for use as a mobile device.

FIG. 6 illustrates elements of an information handling system 600 that may be suitable for use as mobile device 120. Information handling system 600 includes numerous elements in common with FIG. 5 and, in recognition of clarity and brevity as desirable characteristics, the following description emphasizes differences between information handling system 500 and information handling system 600. Elements of information handling system 600 illustrated without a corresponding reference numeral provide functionality analogous to the functionality of like-named elements illustrated in FIG. 5 unless indicated otherwise.

Consistent with at least some of the most pervasive examples of mobile devices, including without limitation, smart phones, tablet devices, laptop computers, and tablet/laptop hybrid systems, the information handling system 600 illustrated in FIG. 6 features various human interface adapters and controllers. In this regard, information handling system 600 is illustrated as including a graphics adapter 604 coupled to bridge/memory controller 603 via a dedicated graphics bus 607, a Bluetooth controller 641 shown in FIG. 6 coupled to a wireless keyboard 631 and a wireless mouse 632, a WiFi transceiver 642 shown wirelessly coupled to a wireless access point 643, a USB touchpad controller 661 and a USB touch screen controller 662 shown coupled to USB controller 612. Information handling system 600 further includes an audio coder/decoder 651 shown coupled to a PCI controller 614.

Whereas the storage controller 522 of the information handling system 500 illustrated in FIG. 5 may support various mass storage device protocols and adapters (not explicitly depicted in FIG. 5), including suitable RAID controllers, smart phone and tablet embodiments of information handling system 600 may lack a mass storage device and laptop embodiments may be implemented with a comparatively simple mass storage interface including, as an example, a single SATA controller 661 couple to a magnetic or solid state drive (not depicted in FIG. 6).

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A device management method, comprising:
    establishing, by an enterprise device manager, a mobile device and a gateway device as managed devices;
    generating mobile device metadata including first metadata and second metadata wherein the first metadata comprises a mobile device identifier and wherein the second metadata comprises managed device data assigned by the enterprise device manager as part of the establishing of the mobile device as a managed device, wherein the mobile device metadata identifies the mobile device as a sanctioned delegate of the enterprise device manager responsive to the gateway device detecting the mobile device initiating a management session with the gateway device;
    generating a management split key including a gateway key part and a mobile key part, wherein the combination of the gateway key part and the mobile key part are sufficient to decrypt information encrypted in accordance with the management split key;
    generating encrypted mobile device metadata comprising the mobile device metadata encrypted with the management split key;
    sending the gateway key part and the encrypted mobile device metadata to the gateway device; and
    sending the mobile key part to the mobile device, wherein subsequent receipt of the mobile key part by the gateway device enables the gateway device to decrypt the encrypted mobile device metadata and recognize the mobile device as a management device delegate sanctioned by the device manager to perform delegated management of the gateway device;
    wherein the mobile device metadata includes information indicative of settings associated with a delegate management connection to be established between the gateway device and the mobile device.

2. The method of claim 1, wherein:
    the management split key includes N key parts, including the gateway key part and the mobile key part;
    knowledge of any M of the N key parts is sufficient to decrypt information encrypted in accordance with the management split key;
    N is an integer greater than 2; and
    M is an integer greater than 1 and less than N.

3. The method of claim 2, wherein N=3 and M=2 and wherein the method includes:
    storing a third key part of the management split key in storage accessible to the enterprise device manager;
    responsive to a loss of access to the mobile key part, recovering data encrypted in accordance with the management split key using the third key part in combination with the gateway key part; and responsive to a loss of access to the gateway key part, recovering data encrypted in accordance with the management split key using the third key part in combination with the mobile key part.

4. The method of claim 1, further comprising:
generating delegate metadata including information indicative of a peripheral device;
generating a delegate split key including a gateway key part and a peripheral key part;
encrypting the delegate metadata in accordance with the delegate split key to generate encrypted delegate metadata; and
sending the gateway key part and the encrypted delegate metadata to the gateway device.

5. A device management method, the method comprising:
receiving, by a mobile device via a management connection between the mobile device and a device manager, a first key part of a first split key from the device manager, wherein the first split key includes a second key part and wherein the first key part in combination with the second key part are sufficient to decrypt information encrypted in accordance with the first split key;
providing, by the mobile device, the first key part of the first split key to a gateway device communicatively isolated from the device manager to authenticate the mobile device as a device management delegate sanctioned by the device manager to perform delegated management of the gateway device, wherein the gateway device includes storage storing the second key part and encrypted mobile device metadata, comprising mobile device metadata, encrypted in accordance with the first split key, wherein the mobile device metadata includes first metadata and second metadata wherein the first metadata comprises a mobile device identifier and wherein the second metadata comprises managed device data assigned by the device manager while establishing the mobile device as a managed device, wherein the mobile device metadata identifies the mobile device as a sanctioned delegate of the device manager responsive to the gateway device detecting the mobile device initiating a management session with the gateway device;
detecting an acknowledgement, from the gateway device, indicating recognition of the mobile device as the device management delegate sanctioned by the device manager; and
responsive to detecting the acknowledgement, performing a delegated device management operation to manage the gateway device as a trusted delegate of a device management resource;
wherein providing the first key part comprises providing the first key part via a personal area network connection between the gateway device and the mobile device.

6. The method of claim 5, wherein a range of the personal area network connection is less than approximately 10 meters.

7. The method of claim 5, wherein:
the delegated device management operation comprises updating a configuration, including gateway device settings and gateway device firmware, of the gateway device; and
updating the configuration includes enabling a peripheral device to deliver update information to the gateway device.

8. The method of claim 7, wherein enabling the peripheral device to deliver the update information includes:

accessing a second split key and encrypted delegate metadata comprising delegate metadata, indicative of the peripheral device, encrypted in accordance with the second split key;
sending a first part of the second split key and the encrypted delegate metadata to the gateway device; and
sending a second part of the second split key to the peripheral device, wherein the second part of the second split key, in combination with the first part of the second split key, is sufficient to decrypt the encrypted delegate metadata.

9. The method of claim 8, wherein the delegate metadata includes information indicative of limitations the gateway device is to enforce and privileges the gateway device is to honor with respect to the mobile device and the peripheral device.

10. The method of claim 8, wherein the second key part of the second split key includes login information enabling the peripheral device to log into the gateway device following authentication.

11. A mobile information handling system, comprising:
a processor;
a non-transitory computer readable storage medium including processor executable instructions that, when executed by the processor, cause the processor to perform operations including:
receiving a second key part of a mobile device split key from a device manager, the mobile device split key comprising the second key part and a first key part;
providing, to a gateway device communicatively isolated from the device manager, the second key part of the mobile device split key to enable the gateway device to:
construct the mobile device split key, from the second key part received from the mobile device and the first key part received from the device manager, and
decrypt, in accordance with the mobile device split key, encrypted mobile device metadata received from the device manager, wherein the encrypted mobile device metadata comprises mobile device metadata, encrypted in accordance with the mobile device split key, thereby authenticating the mobile information handling system as a trusted delegate of the device manager wherein the mobile device metadata includes first metadata and second metadata wherein the first metadata comprises a mobile device identifier and wherein the second metadata comprises managed device data assigned by the device manager as part of establishing the mobile device as a managed device, wherein the mobile device metadata identifies the mobile device as a sanctioned delegate of the device manager responsive to the gateway device detecting the mobile device initiating a management session with the gateway device; and
responsive to the gateway device authenticating the mobile information handling system, providing a managerial resource to the gateway device, wherein providing the managerial resource includes:
generating, by the mobile device, a peripheral device split key including a first key part and a peripheral key part;
pushing the first key part to the gateway device;
pushing the peripheral key part to a peripheral device;
generating encrypted delegate metadata including delegate metadata, indicative of the peripheral device, encrypted in accordance with the peripheral device split key; and
pushing the encrypted delegate metadata to the gateway device wherein the peripheral key part of the peripheral device split key, when received by the gateway device, enables the gateway device to authenticate the peripheral device and receive data from the peripheral device.

12. The mobile information handling system of claim 11, wherein the first key part of the peripheral device split key includes port information indicating a particular port, a particular peripheral device type, and a particular time window, associated with enabling the gateway device to authenticate the peripheral device.

13. The mobile information handling system of claim 11, wherein the delegate metadata is indicative of limitations the gateway device is to enforce and privileges the gateway device is to honor with respect to the peripheral device.

14. The mobile information handling system of claim 11, wherein the peripheral device comprises a portable USB flash drive.

15. A device management information handling system, comprising:
   a processor; and
   a computer readable medium including program instructions that, when executed by the processor, cause the processor to perform program operations comprising:
   device management operations for managing information handling system assets associated with an enterprise, the information handling system assets including a mobile device and a gateway device; and
   management delegation operations comprising:
   generating a management split key including a first key part and a second key part;
   obtaining mobile device metadata including first metadata and second metadata wherein the first metadata comprises a mobile device identifier and wherein the second metadata comprises managed device data assigned by the device management information handling system as part of establishing the mobile device as a managed device, wherein the mobile device metadata identifies the mobile device as a sanctioned delegate of the device management information handling system responsive to the gateway device detecting the mobile device initiating a management session with the gateway device;
   encrypting the mobile device metadata with the management split key to obtain encrypted mobile device metadata;
   sending the encrypted mobile device metadata and the first key part to a gateway device; and
   sending the second key part to the mobile device;
   wherein the mobile device is further configured to:
   generate a delegate split key including a gateway key part and a peripheral key part;
   generate encrypted delegate metadata, indicative of a peripheral device, by encrypting delegate metadata indicative of the peripheral device;
   send the gateway key part and the encrypted delegate metadata to the gateway device; and
   send the peripheral key part to the peripheral device;
   wherein the gateway device is configured to:
   recognize the mobile device as a device management delegate of the device management information handling system responsive to successfully decrypting the encrypted mobile device metadata using the first key part in combination with the second key part; and
   recognize the peripheral device as a device management delegate of the mobile device responsive to successfully decrypting the encrypted delegate metadata using the gateway key part in combination with the peripheral key part
   wherein enabling the mobile device to send the second key part includes:
   providing the mobile device with a delegate management application, wherein the delegate management application includes operations that, when executed by the mobile device, enable the mobile device to perform operations comprising:
   sending a peripheral key part of a delegate split key to a peripheral device, wherein the peripheral key part, when provided to the gateway device by the peripheral device, enables the gateway device to authenticate the peripheral device as a sanctioned subordinate of the mobile device.

16. The device management information handling system of claim 15, wherein the operations include:
   providing the gateway device with encrypted delegate metadata comprising delegate metadata encrypted with the delegate split key, wherein the gateway device is enabled to authenticate the peripheral device by decrypting the encrypted delegate metadata in accordance with the second key part and the peripheral key part.

* * * * *